United States Patent
Sharma et al.

(10) Patent No.: US 10,187,304 B2
(45) Date of Patent: Jan. 22, 2019

(54) PROCESSING INTER-VLAN TRAFFIC IN AN ETHERNET TREE

(71) Applicant: Juniper Networks, Inc., Sunnyvale, CA (US)

(72) Inventors: Manoj Sharma, Cupertino, CA (US); Wen Lin, Andover, MA (US); Nitin Singh, Fremont, CA (US); John E. Drake, Pittsburgh, PA (US)

(73) Assignee: Juniper Networks, Inc., Sunnyvale, CA (US)

(*) Notice: Subject to any disclaimer, the term of this patent is extended or adjusted under 35 U.S.C. 154(b) by 163 days.

(21) Appl. No.: 15/058,416

(22) Filed: Mar. 2, 2016

(65) Prior Publication Data
US 2017/0257311 A1   Sep. 7, 2017

(51) Int. Cl.
| | |
|---|---|
| *H04L 12/753* | (2013.01) |
| *H04L 12/46* | (2006.01) |
| *H04L 12/715* | (2013.01) |
| *H04L 12/18* | (2006.01) |
| *H04L 12/741* | (2013.01) |
| *H04L 12/721* | (2013.01) |

(52) U.S. Cl.
CPC .......... *H04L 45/48* (2013.01); *H04L 12/1886* (2013.01); *H04L 12/462* (2013.01); *H04L 12/4633* (2013.01); *H04L 12/4641* (2013.01); *H04L 45/04* (2013.01); *H04L 45/66* (2013.01); *H04L 45/74* (2013.01)

(58) Field of Classification Search
CPC ...................................................... H04L 45/48
See application file for complete search history.

(56) References Cited

U.S. PATENT DOCUMENTS

| | | | |
|---|---|---|---|
| 2015/0124826 A1* | 5/2015 | Edsall | H04L 12/4633 370/392 |
| 2015/0281096 A1* | 10/2015 | Boutros | H04L 47/20 370/231 |
| 2016/0261428 A1* | 9/2016 | Song | H04L 12/413 |

OTHER PUBLICATIONS

Sajassi et al. ("Internet Engineering Task Force (IETF)—BGP MPLS-Based Ethernet VPN", Feb. 2015).*
Sajassi et al., "E-TREE Support in EVPN & PBB-EVPN," https://tools.ietf.org/html/draft-ietf-bess-evpn-etree-03#page-4, Oct. 10, 2015, 32 pages.

(Continued)

*Primary Examiner* — Jeffrey M Rutkowski
*Assistant Examiner* — Chae S Lee
(74) *Attorney, Agent, or Firm* — Harrity & Harrity, LLP (57) ABSTRACT

A device may receive, from a first device associated with a first LAN, network traffic destined for a second LAN. The device may provide the first LAN with access to a core network. The device may not provide the second LAN with access to the core network. The device may identify, based on the network traffic, a Layer 3 address associated with a second device. The second device may be associated with the second LAN. The device may determine that the first device is categorized as a leaf device within an Ethernet Tree provided by the device. The device may determine, based on the Layer 3 address, that the second device is categorized as a leaf device within the Ethernet Tree. The device may drop the network traffic based on determining that the first device and the second device are categorized as leaf devices within the Ethernet Tree.

20 Claims, 7 Drawing Sheets

(56) References Cited

OTHER PUBLICATIONS

Uttaro et al., "E-TREE Requirements and Solution space," https://www.ietf.org/proceedings/77/slides/l2vpn-4.pdf, Mar. 2010, 12 pages.
Bar-Lev, "E-Tree," https://wiki.mef.net/display/CESG/E-Tree, Dec. 12, 2015, 2 pages.
Sajassi et al., "BGP MPLS-Based Ethernet VPN," https://tools.ietf.org/html/rfc7432, Feb. 2015, 56 pages.
Extended European Search Report corresponding to EP Application No. 16 17 5936, dated Sep. 28, 2016, 11 pages.
Sajassi et al., "E-TREE Support EVPN & PBB-EVPN," https://tools.ietf.org/html/draft-saiassi-l2vpn-evpn-etree-02, Oct. 21, 2013, 11 pages.

\* cited by examiner

PROCESSING INTER-VLAN TRAFFIC IN AN ETHERNET TREE

BACKGROUND

A router may refer to a network device that routes and/or forwards packets between computer networks and/or network devices. A packet is typically forwarded from one router to another through the networks that constitute the Internet until the packet reaches a destination device. When a packet is received by a router, the router may read address information included in the packet to determine the destination for the packet. Then, using information stored in a routing table or indicated by a routing policy, the router may direct the packet toward the destination.

SUMMARY

According to some possible implementations, a provider edge device may include one or more processors to receive, from a first customer edge device associated with a first local area network, network traffic destined for a second local area network. The provider edge device may provide the first local area network with access to a core network. The provider edge device may not provide the second local area network with access to the core network. The one or more processors may identify, based on the network traffic, a Layer 3 address associated with a second customer edge device. The second customer edge device may be associated with the second local area network. The one or more processors may determine that the first customer edge device is categorized as a leaf device within an Ethernet Tree service provided by the provider edge device. The one or more processors may determine, based on the Layer 3 address, that the second customer edge device is categorized as a leaf device within the Ethernet Tree service. The one or more processors may drop the network traffic based on determining that the first customer edge device and the second customer edge device are categorized as leaf devices within the Ethernet Tree service.

According to some possible implementations, a non-transitory computer-readable medium may store one or more instructions that, when executed by one or more processors of a first network device, cause the one or more processors to receive, from a second network device associated with a first local area network, network traffic destined for a second local area network. The first network device may provide the second network device with access to a core network. The one or more instructions may cause the one or more processors to identify, based on the network traffic, an Internet Protocol (IP) address associated with a third network device. The third network device may be associated with the second local area network. The first network device may not provide the third network device with access to the core network. The one or more instructions may cause the one or more processors to determine whether the second network device is categorized as a root device or a leaf device within an Ethernet Tree service provided by the first network device. The one or more instructions may cause the one or more processors to determine, based on the IP address, whether the third network device is categorized as a root device or a leaf device within the Ethernet Tree service. The one or more instructions may cause the one or more processors to selectively drop or transmit the network traffic based on determining whether the second network device is categorized as a root device or a leaf device within the Ethernet Tree service and determining whether the third network device is categorized as a root device or a leaf device within the Ethernet Tree service.

According to some possible implementations, a method may include receiving, by a provider edge device and from a first customer edge device, network traffic destined for a local area network associated with a second customer edge device. The provider edge device may be directly connected to the first customer edge device. The provider edge device may not be directly connected to the second customer edge device. The method may include identifying, by the provider edge device and based on the network traffic, a Layer 3 address associated with the second customer edge device. The method may include determining, by the provider edge device, whether the first customer edge device is categorized as a root or a leaf within an Ethernet Tree service provided by the provider edge device. The method may include determining, by the provider edge device and based on the Layer 3 address, whether the second customer edge device is categorized as a root or a leaf within the Ethernet Tree service. The method may include selectively dropping or transmitting, by the provider edge device, the network traffic based on determining whether the first customer edge device is categorized as a root or a leaf within the Ethernet Tree service and determining whether the second customer edge device is categorized as a root or a leaf within the Ethernet Tree service.

DETAILED DESCRIPTION

The following detailed description of example implementations refers to the accompanying drawings. The same reference numbers in different drawings may identify the same or similar elements.

A Layer 2 Virtual Private Network (VPN) or Ethernet VPN may be provisioned by a provider to provide point-to-multipoint (e.g., multicast or broadcast) connectivity between devices. An Ethernet VPN may include customer devices (e.g., customer edge routers located on a customer premises) and provider edge devices (e.g., provider edge routers located on the edge of a provider's core network). A customer device may communicate with a provider edge device via an Ethernet interface (e.g., a User-Network Interface (UNI) or an attachment circuit (AC)) to provide connectivity between a customer's local area network (LAN) and the provider's core network.

An Ethernet VPN service may be provided as an Ethernet Tree (E-Tree), which may refer to a rooted multipoint service where an interface between a customer device and a provider edge device is categorized as a root interface or a leaf interface. An Ethernet Tree service may include one or more root interfaces and at least two leaf interfaces. The Ethernet Tree service supports root-to-root communications, root-to-leaf communications, and leaf-to-root communications, but prohibits leaf-to-leaf communications to increase security and customer privacy. A tree node type indicator may indicate whether a customer device is categorized as a root device or a leaf device, and may be used to prohibit leaf-to-leaf communications.

When an Ethernet Tree service is provided across multiple virtual local area networks (VLANs), provider edge device may be unable to prohibit leaf-to-leaf communications because the tree node type indicator is associated with a Layer 2 device identifier, such as a media access control (MAC) address. In some cases, a provider edge device may not be able to determine Layer 2 information, such as a MAC address, for a customer device associated with a VLAN that is not directly served by the provider edge device. Thus, a provider edge device may be unable to identify the customer device as a root device or a leaf device, thereby preventing the provider edge device from prohibiting leaf-to-leaf communications. Implementations described herein permit provider edge devices to share tree node type indicators by associating the tree node type indicator with Layer 3 information, such as an Internet Protocol (IP) address, thereby increasing security and customer privacy.

Figure 1A:
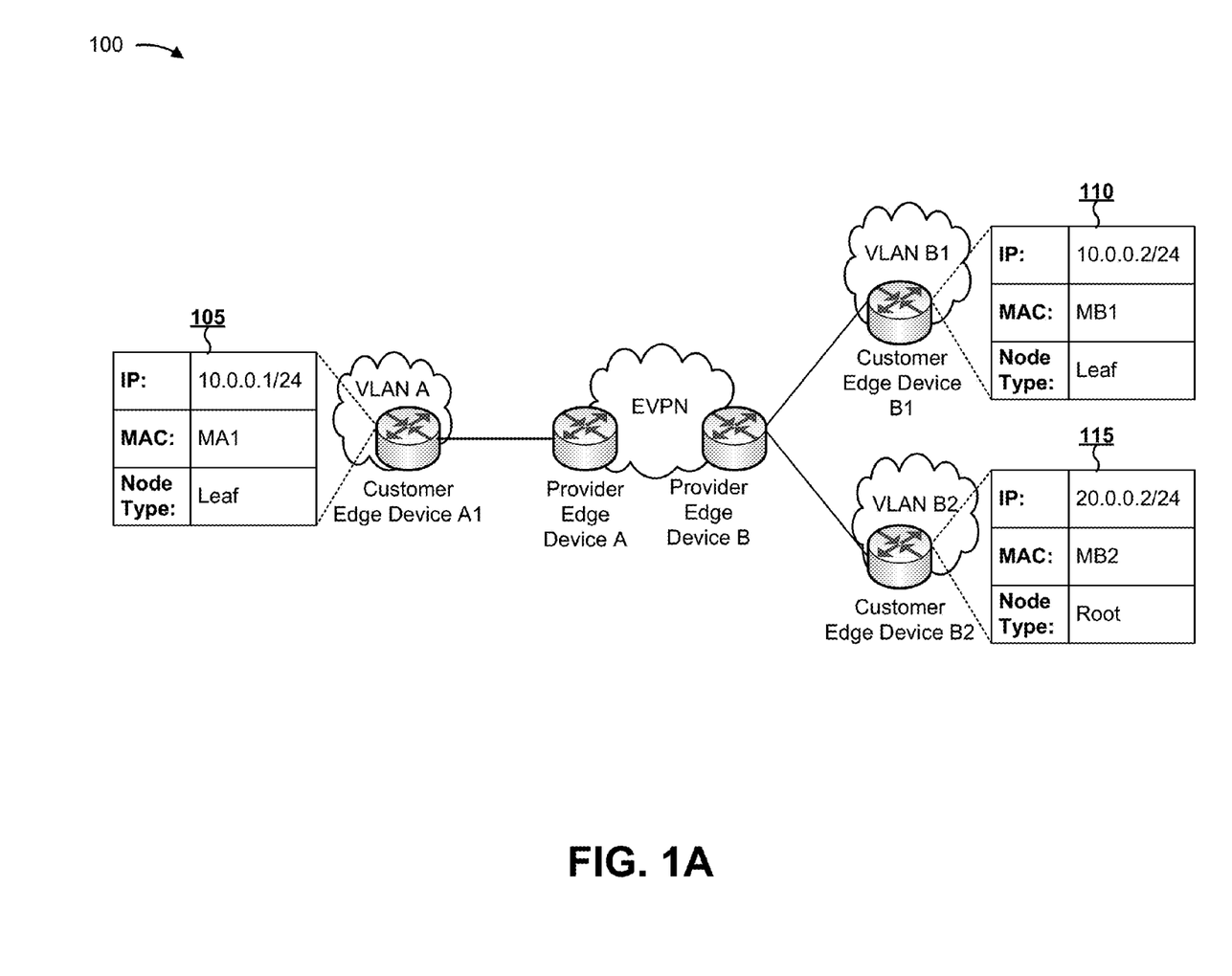
FIGS. 1A-1D are diagrams of an overview of an example implementation described herein.

FIGS. 1A-1D are diagrams of an overview of an example implementation 100 described herein. As shown in FIG. 1A, an Ethernet VPN service may be provided as an Ethernet Tree that includes multiple provider edge devices and multiple customer edge devices. For example, assume that a first provider edge device, shown as Provider Edge Device A, communicates with a first customer edge device, shown as Customer Edge Device A1, associated with a first VLAN, shown as VLAN A. As shown by reference number 105, assume that Customer Edge Device A1 has an IP address in a range defined by a prefix of 10.0.0.1/24, has a MAC address of MA1, and is categorized as a leaf device.

Further, assume that a second provider edge device, shown as Provider Edge Device B, communicates with a second customer edge device, shown as Customer Edge Device B1, associated with a second VLAN, shown as VLAN B1. Similarly, assume that Provider Edge Device B communicates with a third customer edge device, shown as Customer Edge Device B2, associated with a third VLAN, shown as VLAN B2. While not shown, in some implementations, a provider edge device may communicate with multiple customer edge devices associated with a single VLAN. As shown by reference number 110, assume that Customer Edge Device B1 has an IP address in a range defined by a prefix of 10.0.0.2/24, has a MAC address of MB1, and is categorized as a leaf device. As shown by reference number 115, assume that Customer Edge Device B2 has an IP address in a range defined by a prefix of 20.0.0.2/24, has a MAC address of MB2, and is categorized as a root device.

Figure 1B:
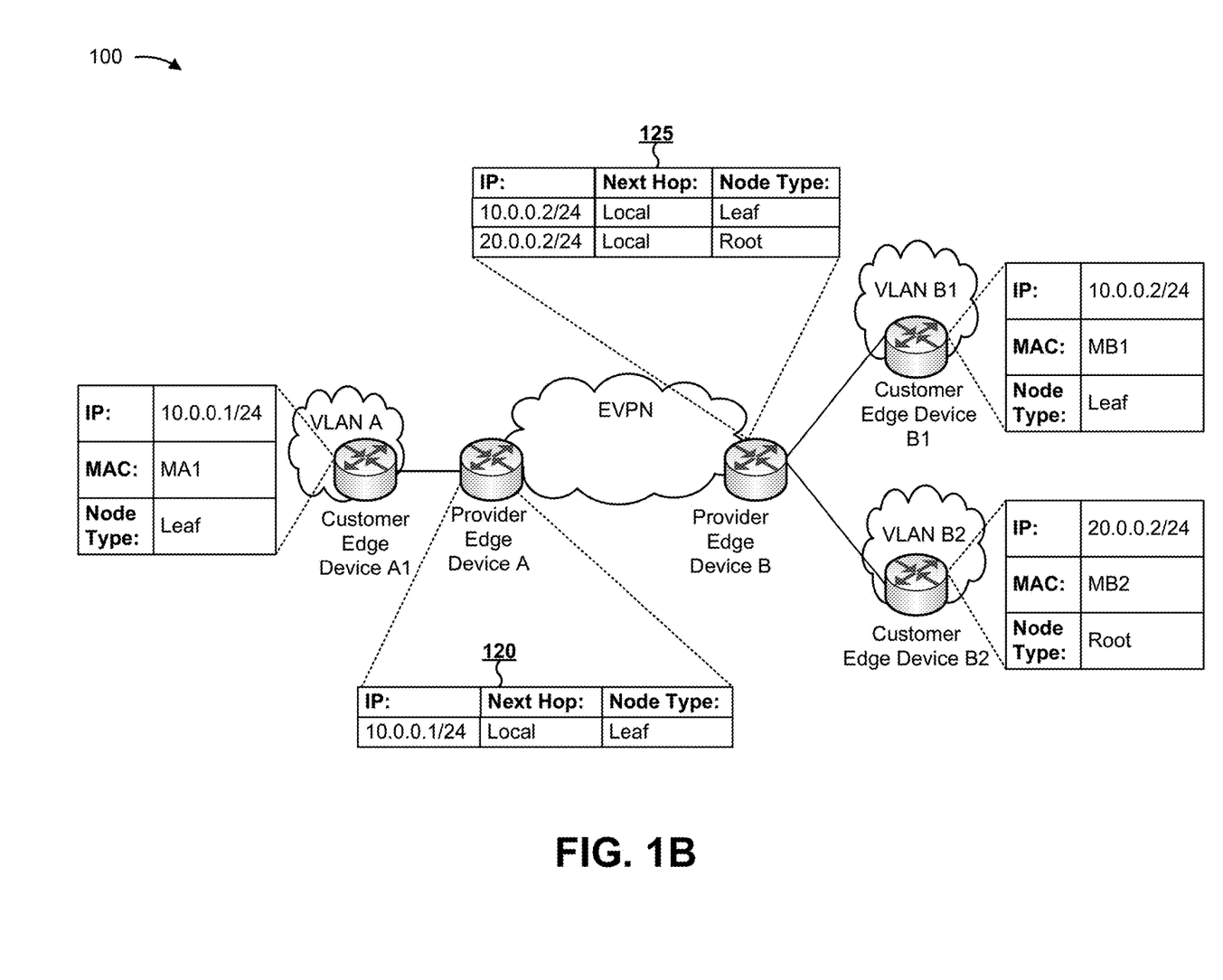

As shown in FIG. 1B, assume that the provider edge devices store data structures with Layer 3 information to permit routing of packets between provider edge devices (e.g., using TCP/IP). For example, a provider edge device may communicate with a customer edge device on a local network (e.g., a VLAN) to determine an IP address of the customer edge device, information that identifies a next hop for routing packets to the customer edge device, and a tree node type identifier that indicates whether the customer edge device is categorized as a root device or a leaf device.

As shown by reference number 120, assume that Provider Edge Device A stores, in a Layer 3 data structure, information that indicates that Customer Edge Device A1 has an IP address in the range defined by the prefix of 10.0.0.1/24, is located on a VLAN local to Provider Edge Device A (e.g., has a local next hop), and is categorized as a leaf device. As shown by reference number 125, assume that Provider Edge Device B stores, in a Layer 3 data structure, information that indicates that Customer Edge Device B1 has an IP address in the range defined by the prefix of 10.0.0.2/24, is located on a VLAN local to Provider Edge Device B (e.g., has a local next hop), and is categorized as a leaf device. Further, assume that Provider Edge Device B stores, in the Layer 3 data structure, information that indicates that Customer Edge Device B2 has an IP address in the range defined by the prefix of 20.0.0.2/24, is located on a VLAN local to Provider Edge Device B (e.g., has a local next hop), and is categorized as a root device.

Figure 1C:
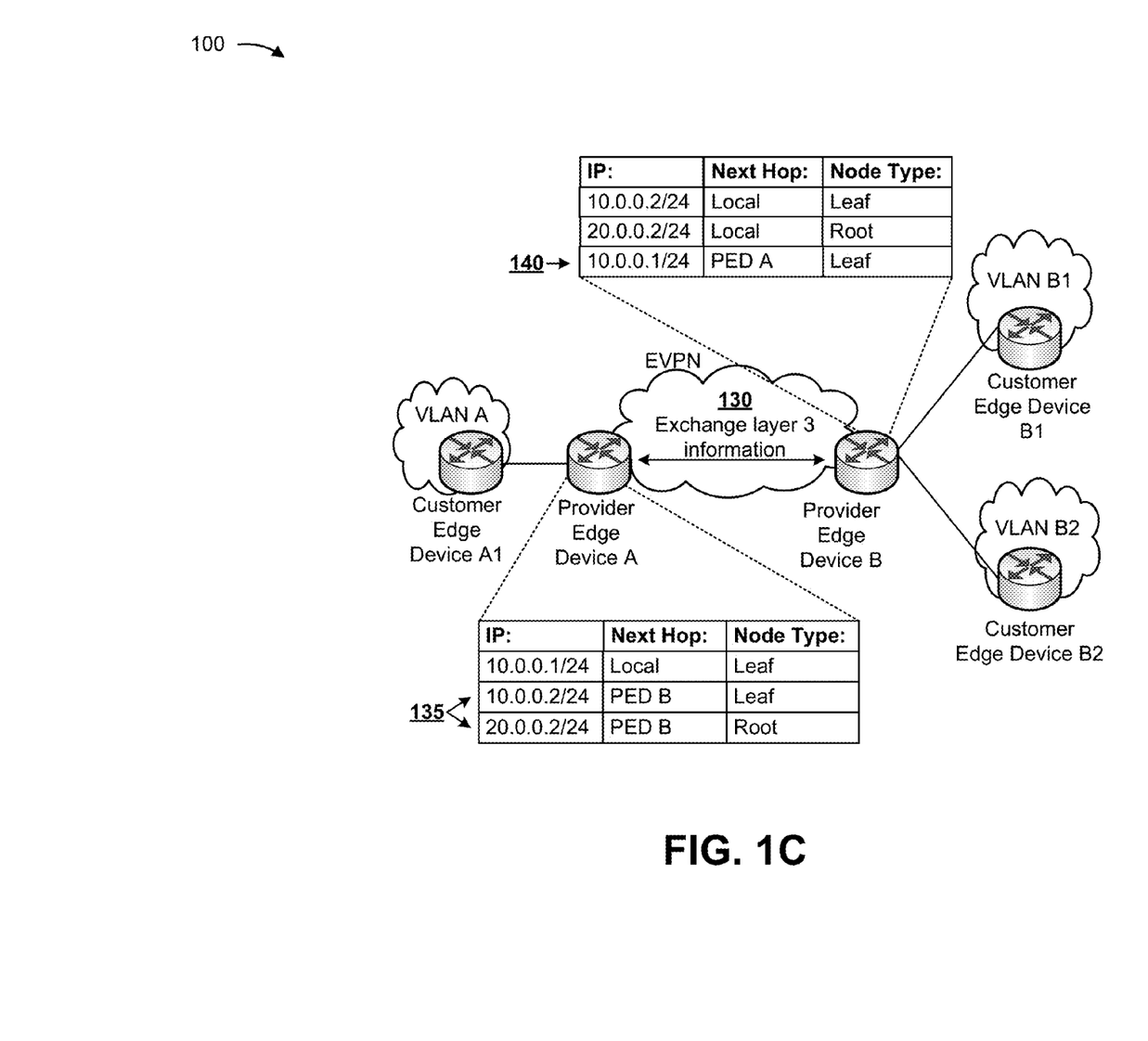

As shown in FIG. 1C, and by reference number 130, Provider Edge Device A and Provider Edge Device B may exchange Layer 3 information, including tree node type indicators that indicate whether customer edge devices, identified by IP addresses, are categorized as root devices or leaf devices. For example, as shown by reference number 135, assume that Provider Edge Device A stores, in the Layer 3 data structure, information that indicates that Customer Edge Device B1 has an IP address in the range defined by the prefix of 10.0.0.2/24, has a next hop of Provider Edge Device B, and is categorized as a leaf device. Further, assume that Provider Edge Device A stores, in the Layer 3 data structure, information that indicates that Customer Edge Device B2 has an IP address in the range defined by the prefix of 20.0.0.2/24, has a next hop of Provider Edge Device B, and is categorized as a root device. Similarly, as shown by reference number 140, assume that Provider Edge Device B stores, in the Layer 3 data structure, information that indicates that Customer Edge Device A1 has an IP address in the range defined by the prefix of 10.0.0.1/24, has a next hop of Provider Edge Device A, and is categorized as a leaf device.

Figure 1D:
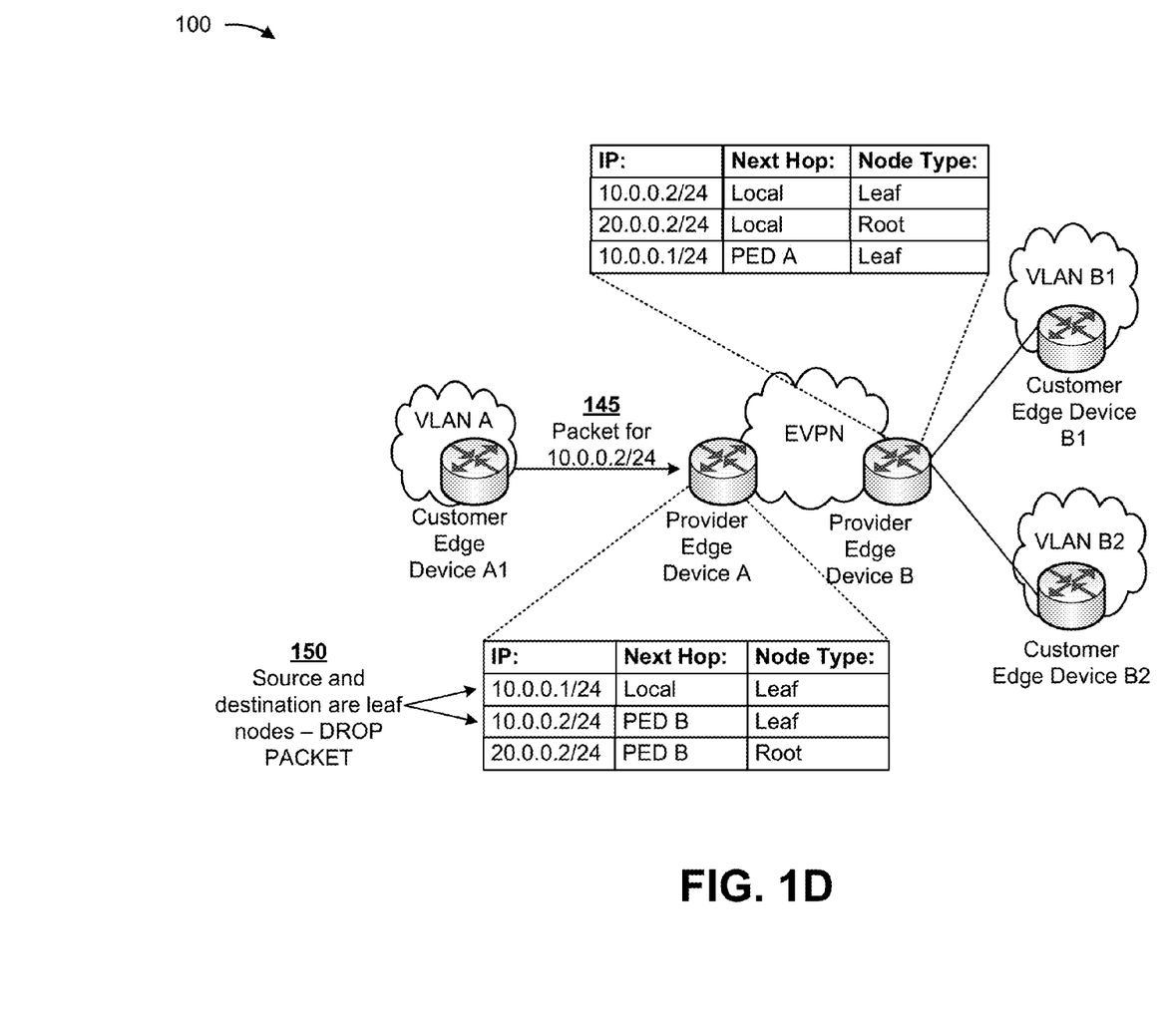

As shown in FIG. 1D, and by reference number 145, assume that after storing the exchanged information in the Layer 3 data structure, Provider Edge Device A receives a packet (or a frame) from Customer Edge Device A1. Assume that the packet is destined for a device with an IP address in the range defined by the prefix of 10.0.0.2/24 (e.g., is destined for Customer Edge Device B1). As shown by reference number 150, Provider Edge Device A may use the IP address to look up a tree node type indicator, for the destination of the packet, in the Layer 3 data structure. Provider Edge Device A may also look up a tree node type indicator for the source of the packet (e.g., Customer Edge Device A1). In this case, since the tree node type indicators indicate that the source and the destination are both categorized as leaf devices, Provider Edge Device A drops the packet because leaf-to-leaf communications are prohibited in an Ethernet Tree. In this way, provider edge devices may increase security and customer privacy by preventing leaf-to-leaf communications in an Ethernet Tree that spans multiple VLANs.

As indicated above, FIGS. 1A-1D are provided merely as an example. Other examples are possible and may differ from what was described with regard to FIGS. 1A-1D.

Figure 2:
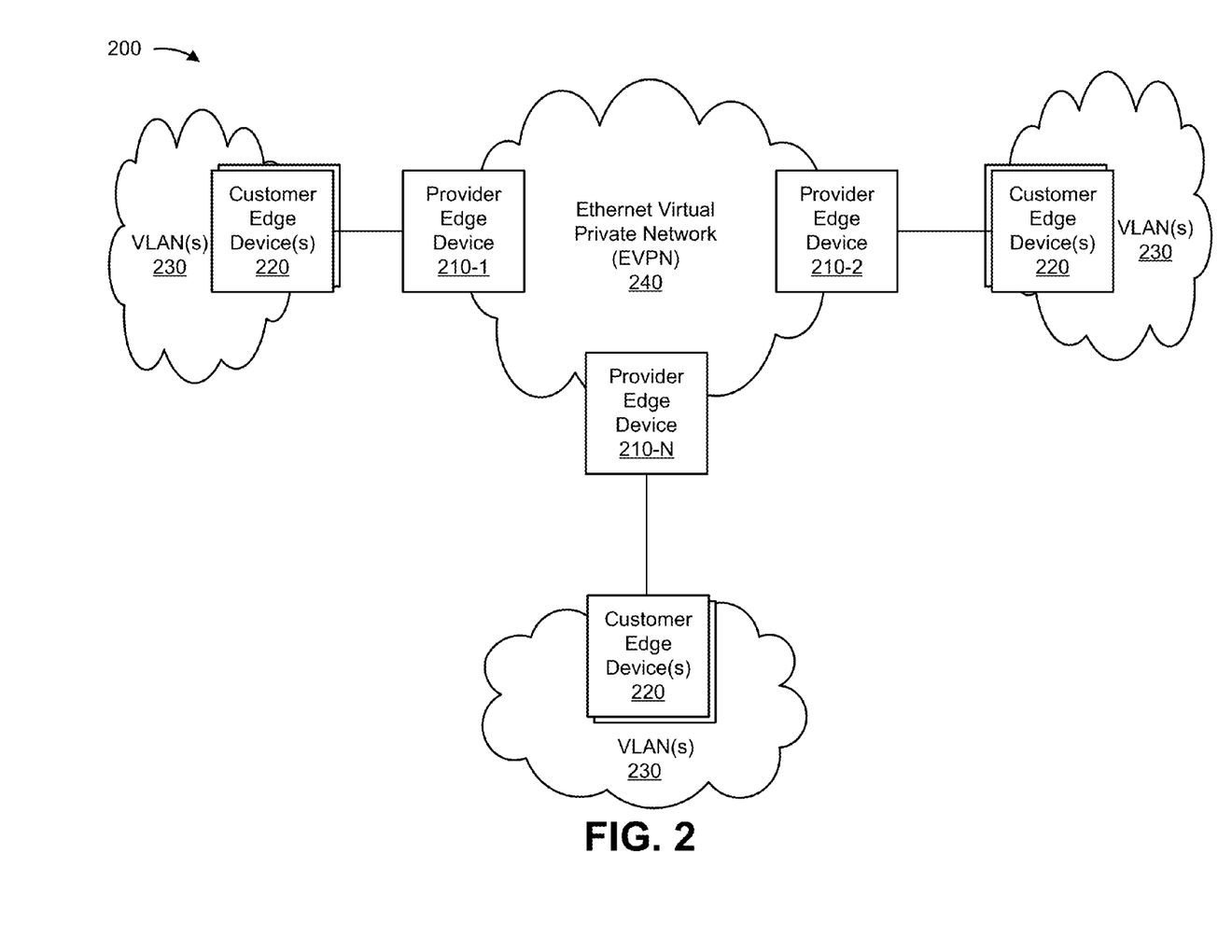
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of provider edge devices 210-1 through 210-N (N≥1) (hereinafter referred to collectively as "provider edge devices 210," and individually as "provider edge device 210"), a set of customer edge devices 220, a set of virtual local area networks (VLANs) 230, and an Ethernet Virtual Private Network (EVPN) 240. Devices of environment 200 may interconnect via wired connections, wireless connections, or a combination of wired and wireless connections.

Provider edge device 210 includes one or more network devices (e.g., one or more traffic transfer devices) capable of processing and transferring traffic. For example, provider edge device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, provider edge device 210 may be located on an edge of a core network of a service provider (e.g., an Internet service provider), and may provide access to the core network. For example, provider edge device 210 may provide access, to the core network, to customer edge device 220 associated with a LAN of a customer (e.g., VLAN 230). Additionally, or alternatively, provider edge device 210 may communicate with one or more other provider edge devices 210 to permit communications between different customer edge devices 220 (and/or VLANs 230).

Customer edge device 220 includes one or more network devices (e.g., one or more traffic transfer devices) capable of processing and transferring traffic. For example, customer edge device 220 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, customer edge device 220 may be located on an edge of a customer premises, and may communicate with provider edge device 210 to gain access to a service provider's core network. Additionally, or alternatively, customer edge device 220 may communicate with one or more endpoint devices via a LAN (e.g., VLAN 230) to provide the endpoint device(s) with access to the core network via customer edge device 220 and provider edge device 210.

VLAN 230 includes one or more wired and/or wireless networks. In some implementations VLAN 230 may include a virtual local area network. Additionally, or alternatively, VLAN 230 may include another type of LAN. In some implementations, endpoint devices associated with a customer may communicate with one another internally via VLAN 230. Additionally, or alternatively, the endpoint devices may communicate with external devices (e.g., not included in VLAN 230) via customer edge device 220 and provider edge device 210.

Ethernet VPN 240 includes a Layer 2 Virtual Private Network (VPN) that provides an Ethernet Tree service (e.g., a rooted multipoint service). In some implementations, Ethernet VPN 240 may be provisioned by a service provider to provide point-to-multipoint (e.g., multicast or broadcast) traffic between endpoint devices (e.g., via provider edge devices 210 and customer edge devices 220). In an Ethernet Tree, a root device is typically a source for point-to-multipoint traffic, while a leaf device is typically a destination for point-to-multipoint traffic.

In some implementations, customer edge device 220 may be categorized as a root device or a leaf device in the Ethernet Tree. Additionally, or alternatively, an interface between customer edge device 220 and provider edge device 210 may be categorized as a root interface (e.g., where customer edge device(s) 220 that connect via the root interface are root devices) or a leaf interface (e.g., where customer edge device(s) 220 that connect via the leaf interface are leaf devices) in the Ethernet Tree. An interface between customer edge device 220 and provider edge device 210 may include, for example, a physical interface (e.g., a physical port) or a logical interface (e.g., a logical port), and may be referred to as a User-Network Interface (UNI) or an attachment circuit (AC).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
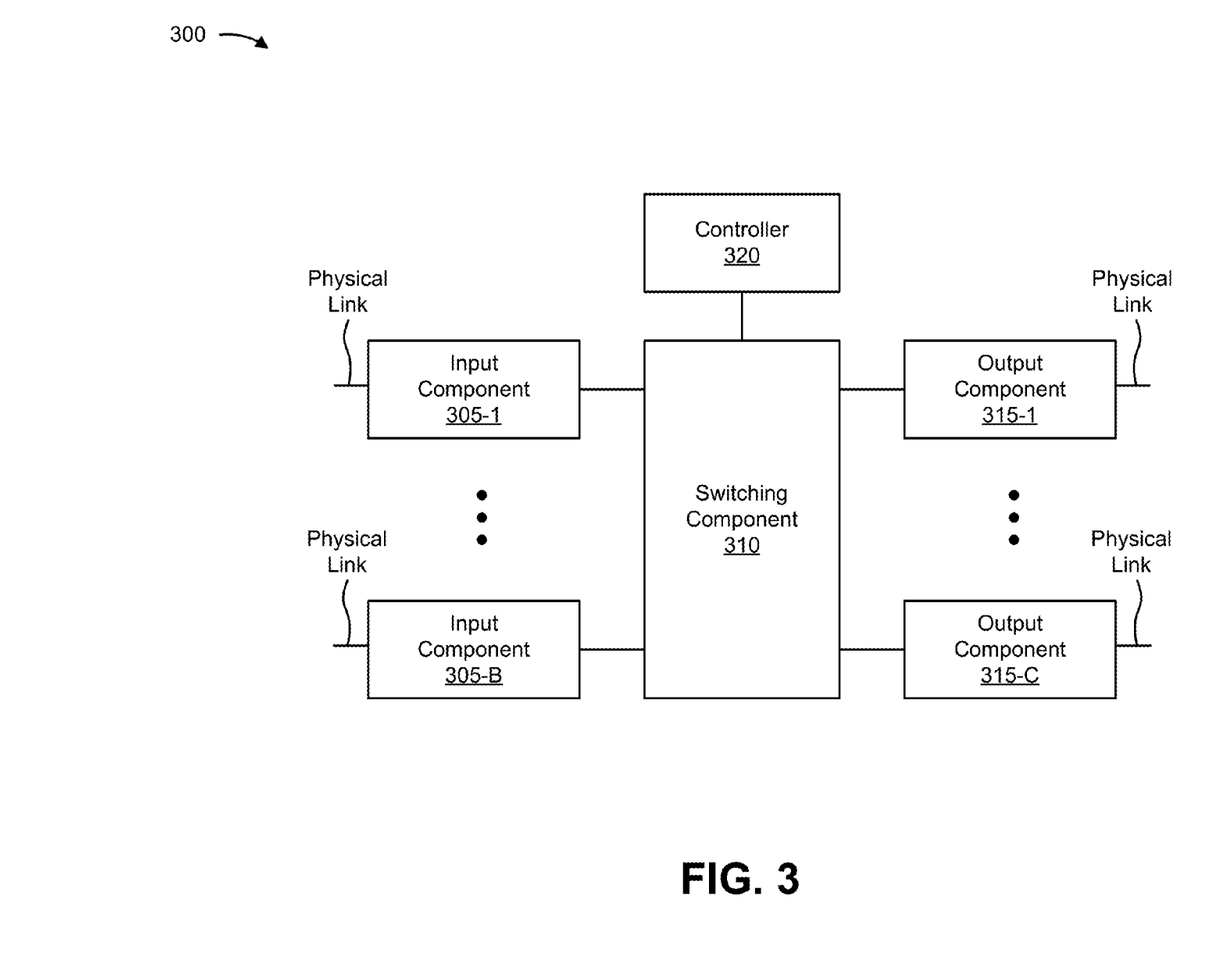
FIG. 3 is a diagram of example components of one or more devices of FIG. 2.

FIG. 3 is a diagram of example components of a device 300. Device 300 may correspond to provider edge device 210 and/or customer edge device 220. In some implementations, provider edge device 210 and/or customer edge device 220 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections, wireless connections, or a combination of wired and wireless connections.

Input component 305 includes a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
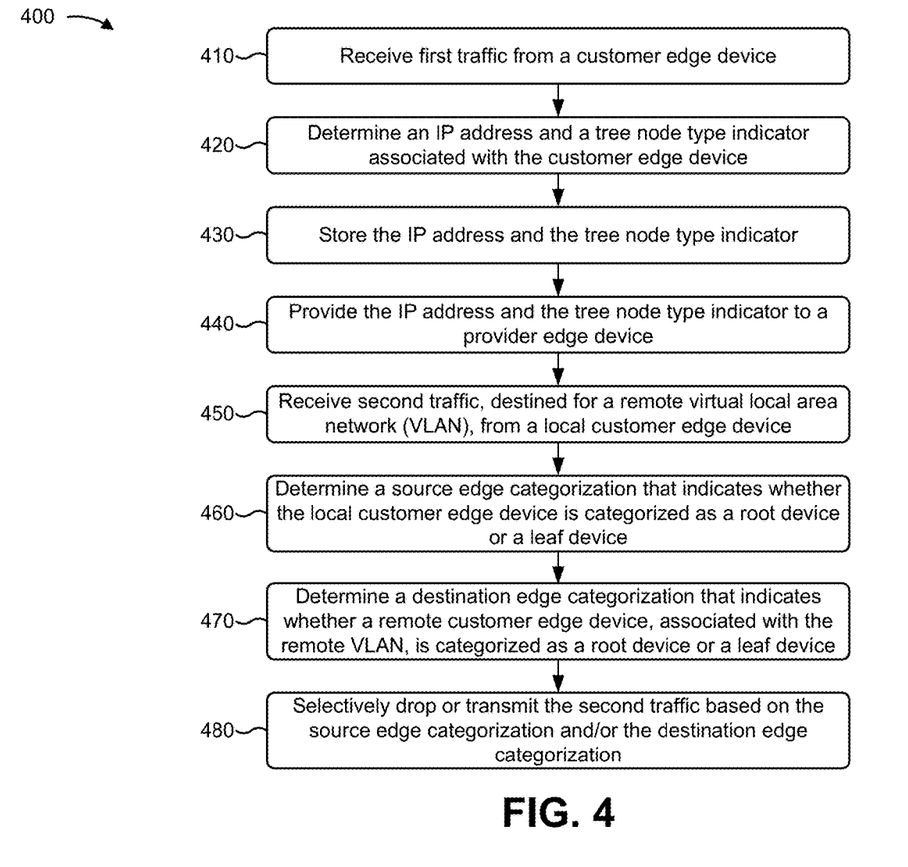
FIG. 4 is a flow chart of an example process for processing inter-VLAN traffic in an Ethernet Tree.

FIG. 4 is a flow chart of an example process 400 for processing inter-VLAN traffic in an Ethernet Tree. In some implementations, one or more process blocks of FIG. 4 may be performed by provider edge device 210. In some implementations, one or more process blocks of FIG. 4 may be performed by another device or a group of devices separate from or including provider edge device 210, such as customer edge device 220.

As shown in FIG. 4, process 400 may include receiving first traffic from a customer edge device (block 410), and determining an IP address and a tree node type indicator associated with the customer edge device (block 420). For example, provider edge device 210 may receive first traffic (e.g., network traffic, such as a frame, a packet, a flow, etc.) from a local customer edge device 220 that communicates directly with provider edge device 210 (e.g., via an Ethernet interface). Provider edge device 210 may determine an IP address (or a range of IP addresses) associated with customer edge device 220. For example, an IP address may identify customer edge device 220, or may identify an endpoint device within a LAN served by customer edge device 220. In some implementations, provider edge device 210 may determine the IP address based on a source IP address included in the first traffic (e.g., included in a packet). While some implementations are described herein in connection with IP addresses, other Layer 3 addresses may be used in some implementations.

Additionally, or alternatively, provider edge device 210 may determine a tree node type indicator that indicates whether customer edge device 220 is a root device or a leaf device in an Ethernet Tree. In some implementations, provider edge device 210 may determine the tree node type identifier based on an interface via which the first traffic is received from customer edge device 220. For example, when provider edge device 210 is provisioned to provide service to customer edge device 220 (e.g., to provider customer edge device 220 with access to a core network), provider edge device 210 may be configured (e.g., by an administrator, an operator, or a customer) to communicate with customer edge device 220 via one or more interfaces.

During the provisioning process, provider edge device 210 may store a tree node type indicator that indicates whether an interface and/or a customer edge device 220 is a root or a leaf in the Ethernet Tree. When provider edge device 210 receives the first traffic, provider edge device 210 may identify an interface via which the traffic is received and/or may identify a customer edge device 220 from which the traffic is received, and may look up the tree node type indicator based on the interface and/or the customer edge device 220.

As further shown in FIG. 4, process 400 may include storing the IP address and the tree node type indicator (block 430). For example, provider edge device 210 may store the IP address in association with the tree node type indicator. In some implementations, provider edge device 210 may store the IP address and the tree node type indicator in a Layer 3 data structure, such as a routing table, a forwarding table, a flow table, an IP address table, or a virtual routing and forwarding (VRF) table. In some implementations, provider edge device 210 may store other routing information in the Layer 3 data structure, such as a next hop indicator that indicates an address of a network device (e.g., a provider edge device 210) to which traffic is to be forwarded to reach customer edge device 220, an interface identifier that identifies an interface via which traffic is to be sent to reach customer edge device 220, a metric associated with routing the traffic, or the like.

In some implementations, provider edge device 210 may store a MAC address of customer edge device 220 in association with a tree node type indicator associated with customer edge device 220. For example, provider edge device 210 may store the MAC address and the tree node type indicator in a Layer 2 data structure, such as a MAC address table, a content addressable memory (CAM) table, or the like.

However, when provider edge device 210 sends traffic from a local customer edge device 220 (e.g., that communicates directly with provider edge device 210 or that is associated with a VLAN 230 served by provider edge device 210) to a remote customer edge device 220 (e.g., that does not communicate directly with provider edge device 210 or that is associated with a VLAN 230 not served by provider edge device 210), provider edge device 210 may not store a tree node type indicator in association with a MAC address of the remote customer edge device 220 (e.g., because Layer 2 information may be removed from traffic transmitted between provider edge devices 210). In this case, provider edge device 210 would not be able to use the Layer 2 data structure to look up a tree node type indicator for the remote customer edge device 220 to prevent leaf-to-leaf communications in the Ethernet Tree. Thus, provider edge device 210 may store the tree node type indicator in a Layer 3 data structure in association with an IP address, so that leaf-to-leaf communications can be prevented for traffic transmitted between two different VLANs 230.

In some implementations, provider edge device 210 may determine whether the first traffic is destined for a remote customer edge device 220 and/or a remote VLAN 230 prior to storing the IP address and the tree node type indicator. If the first traffic is destined for a remote customer edge device 220 and/or a remote VLAN 230, then provider edge device 210 may store the IP address and the tree node type indicator in the Layer 3 data structure (and may also store the MAC address and the tree node type indicator in the Layer 2 data structure, in some implementations). However, if the first traffic is destined for a local customer edge device 220 and/or a local VLAN 230, then provider edge device 210 may prevent the IP address and the tree node type indicator from being stored in the Layer 3 data structure (but may store the MAC address and the tree node type indicator in the Layer 2 data structure, in some implementations). In this way, provider edge device 210 may conserve memory resources by preventing unnecessary information from being stored in the Layer 3 data structure (e.g., when traffic from customer edge device 220 will not be transmitted to another provider edge device 210 using Layer 3 information).

In some implementations, a local customer edge device 220 may be referred to as an internal customer edge device 220 because the local customer edge device 220 is internal to a VLAN 230 served by provider edge device 210. In some implementations, a remote customer edge device 220 may be referred to as an external customer edge device 220 because the remote customer edge device 220 is external to a VLAN 230 served by provider edge device 210.

As further shown in FIG. 4, process 400 may include providing the IP address and the tree node type indicator to a provider edge device (block 440). For example, provider edge device 210 may provide the IP address, in association with the tree node type indicator, to another provider edge device 210. Similarly, provider edge device 210 may receive one or more IP addresses and corresponding tree node type indicator(s) from other provider edge device(s) 210. In this way, multiple provider edge devices 210 may exchange information that can be used to prevent leaf-to-leaf communications in an Ethernet Tree in which the provider edge devices 210 are included, thereby increasing security and customer privacy.

For example, provider edge devices 210 may exchange information stored in Layer 3 data structures. The exchanged information may be advertised, subscribed to, requested, pushed, and/or pulled by provider edge device(s) 210. In some implementations, this information may be exchanged using control plane messages between provider edge devices 210. In some implementations, multiple provider edge devices 210 may synchronize Layer 3 data structures so that each provider edge device 210 uses the same information to permit and/or prevent communications between customer edge devices 220.

As further shown in FIG. 4, process 400 may include receiving second traffic, destined for a remote virtual local area network (VLAN), from a local customer edge device (block 450), and determining a source edge categorization that indicates whether the local customer edge device is categorized as a root device or a leaf device (block 460). For example, provider edge device 210 may receive second traffic (e.g., network traffic) from a local customer edge device 220. The second traffic may be destined for a remote VLAN 230 and/or a remote customer edge device 220.

Provider edge device 210 may determine a source edge categorization that indicates whether local customer edge device 220 is categorized as a root device or a leaf device in the Ethernet Tree. For example, provider edge device 210 may use the Layer 2 data structure and/or the Layer 3 data structure to determine the source edge categorization (which may be stored in both the Layer 2 data structure and the Layer 3 data structure because the local customer edge device 220 is local to provider edge device 210). If provider edge device 210 uses the Layer 2 data structure, then provider edge device 210 may use the MAC address of the local customer edge device 220 to look up a tree node type indicator for the local customer edge device 220. If provider edge device 210 uses the Layer 3 data structure, then provider edge device 210 may use the IP address of the local customer edge device 220 to look up a tree node type indicator for the local customer edge device 220. The tree node type indicator may be the source edge categorization (e.g., root device or leaf device).

In some implementations, provider edge device 210 may use the Layer 3 data structure to look up the tree node type indicator for the local customer edge device 220 when the second traffic is to be sent to a remote customer edge device 220 and/or an endpoint on a remote VLAN 230. Additionally, or alternatively, provider edge device 210 may use the Layer 2 data structure to look up the tree node type indicator for the local customer edge device 220 when the second traffic is to be sent to a local customer edge device 220 and/or an endpoint on a local VLAN 230. This may conserve processing resources because information associated with the local customer edge device 220 may not be stored in a Layer 3 data structure if local customer edge device 220 only communicates locally.

As further shown in FIG. 4, process 400 may include determining a destination edge categorization that indicates whether a remote customer edge device, associated with the remote VLAN, is categorized as a root device or a leaf device (block 470), and selectively dropping or transmitting the second traffic based on the source edge categorization and/or the destination edge categorization (block 480). For example, provider edge device 210 may determine a destination edge categorization that indicates whether a remote customer edge device 220 and/or an endpoint on a remote VLAN 230 is categorized as a root device or a leaf device in the Ethernet Tree. Provider edge device 210 may use the Layer 3 data structure to determine the destination edge categorization. For example, provider edge device 210 may use the IP address associated with the remote customer edge device 220 to look up a tree node type indicator for the remote customer edge device 220. The tree node type indicator may be the destination edge categorization (e.g., root device or leaf device).

In this case, provider edge device 210 may not be able to use the Layer 2 data structure to determine the destination edge categorization for the remote customer edge device 220 because provider edge device 210 does not store a tree node type indicator in association with Layer 2 information for devices associated with remote VLANs 230. Thus, provider edge device may use the Layer 3 data structure to determine the destination edge categorization based on information received from a remote provider edge device 210 that serves the remote customer edge device 220 (e.g., that communicates directly with the remote customer edge device 220). In this way, provider edge device 210 may prevent inter-VLAN leaf-to-leaf communications, thereby increasing security and customer privacy in an Ethernet Tree service.

For example, if the source edge categorization indicates that local customer edge device 220 is a leaf device, and if the destination edge categorization indicates that remote customer edge device 220 is a leaf device, then provider edge device 210 may drop the second traffic. For all other combinations of source and destination edge categorizations (e.g., root-to-root, leaf-to-root, and root-to-leaf), provider edge device 210 may transmit the second traffic. Additionally, or alternatively, provider edge device 210 may use an access control list (ACL) that indicates whether to drop or transmit traffic from a first customer edge device 220 to a second customer edge device 220 (e.g., based on IP address(es), MAC address(es), and/or tree node type indicator(s)). In this way, provider edge device 210 may increase customer security and privacy by preventing leaf-to-leaf communications (e.g., by preventing customers from seeing one another's traffic).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein permit provider edge devices to share tree node type indicators by associating the tree node type indicator with Layer 3 information, such as an Internet Protocol (IP) address, thereby increasing security and customer privacy and permitting inter-VLAN traffic in an Ethernet Tree.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A provider edge device, comprising:
   an input component; and
   one or more processors to:
      receive, from a first customer edge device associated with a first local area network, network traffic destined for a second local area network,
         the provider edge device providing the first local area network with access to a core network,
         the provider edge device not providing the second local area network with access to the core network;
      identify, based on the network traffic, a Layer 3 address associated with a second customer edge device,
         the second customer edge device being associated with the second local area network;
      receive, from another provider edge device that removes Layer 2 information from traffic transmitted to the provider edge device, the Layer 3 address and a tree node type indicator associated with the Layer 3 address,
         the tree node type indicator associated with the Layer 3 address indicating that the second customer edge device, associated with the Layer 3 address, is categorized as a leaf device within an Ethernet Tree service;
      determine that the first customer edge device is categorized as a leaf device within the Ethernet Tree service provided by the provider edge device;
      determine, based on the Layer 3 address and the tree node type indicator associated with the Layer 3 address, that the second customer edge device is categorized as the leaf device within the Ethernet Tree service; and
      drop the network traffic based on determining that the first customer edge device and the second customer edge device are categorized as leaf devices within the Ethernet Tree service.

2. The provider edge device of claim 1, where the Layer 3 address is an Internet Protocol address.

3. The provider edge device of claim 1, where the one or more processors are further to:
   store the Layer 3 address and the tree node type indicator in a Layer 3 data structure.

4. The provider edge device of claim 3, where the one or more processors, when determining that the second customer edge device is categorized as a leaf device within the Ethernet Tree service, are to:

use the Layer 3 data structure to determine that the second customer edge device is categorized as a leaf device within the Ethernet Tree service.

5. The provider edge device of claim 1, where the Layer 3 address is a first Layer 3 address; and
where the one or more processors are further to:
determine a second Layer 3 address associated with the first customer edge device;
store, in a Layer 3 data structure, the second Layer 3 address in association with the tree node type indicator that indicates that the first customer edge device is categorized as a leaf device within the Ethernet Tree service; and
provide the second Layer 3 address and the tree node type indicator to another provider edge device.

6. The provider edge device of claim 5, where the one or more processors are further to:
determine that the network traffic is destined for the second local area network; and
where the one or more processors, when storing the second Layer 3 address in association with the tree node type indicator, are to:
store the Layer 3 address in association with the tree node type indicator based on determining that the network traffic is destined for the second local area network.

7. A non-transitory computer-readable medium storing instructions, the instructions comprising:
one or more instructions that, when executed by one or more processors of a first network device, cause the one or more processors to:
receive, from a second network device associated with a first local area network, network traffic destined for a second local area network,
the first network device providing the second network device with access to a core network;
identify, based on the network traffic, an Internet Protocol (IP) address associated with a third network device,
the third network device being associated with the second local area network,
the first network device not providing the third network device with access to the core network;
receive, from a fourth network device that removes the IP address from traffic transmitted to the first network device, the IP address and a tree node type indicator associated with the IP address,
the tree node type indicator associated with the IP address indicating that the third network device, associated with the IP address, is categorized as a leaf device within an Ethernet Tree service;
determine whether the second network device is categorized as a root device or a leaf device within the Ethernet Tree service provided by the first network device;
determine, based on the IP address and the tree node type indicator associated with the IP address, whether the third network device is categorized as the root device or the leaf device within the Ethernet Tree service; and
selectively drop or transmit the network traffic based on:
determining whether the second network device is categorized as a root device or a leaf device within the Ethernet Tree service, and
determining whether the third network device is categorized as a root device or a leaf device within the Ethernet Tree service.

8. The non-transitory computer-readable medium of claim 7, where the one or more instructions, when executed by the one or more processors, further cause the one or more processors to:
determine that at least one of the second network device or the third network device is categorized as a root device within the Ethernet Tree service; and
where the one or more instructions, that cause the one or more processors to selectively drop or transmit the network traffic, cause the one or more processors to:
transmit the network traffic based on determining that at least one of the second network device or the third network device is categorized as a root device within the Ethernet Tree service.

9. The non-transitory computer-readable medium of claim 7, where the one or more instructions, when executed by the one or more processors, further cause the one or more processors to:
determine that both the second network device and the third network device are categorized as leaf devices within the Ethernet Tree service; and
where the one or more instructions, that cause the one or more processors to selectively drop or transmit the network traffic, cause the one or more processors to:
drop the network traffic based on determining that both the second network device and the third network device are categorized as leaf devices within the Ethernet Tree service.

10. The non-transitory computer-readable medium of claim 7, where the one or more instructions, when executed by the one or more processors, further cause the one or more processors to:
store, in a data structure that stores Layer 3 information, the IP address in association with the tree node type indicator that indicates whether the third network device, associated with the IP address, is categorized as a root device or a leaf device within the Ethernet Tree service.

11. The non-transitory computer-readable medium of claim 10, where the one or more instructions, that cause the one or more processors to determine whether the third network device is categorized as a root device or a leaf device within the Ethernet Tree service, are to:
look up the tree node type indicator, in the data structure, using the IP address; and
determine whether the third network device is categorized as a root device or a leaf device within the Ethernet Tree service based on the tree node type indicator.

12. The non-transitory computer-readable medium of claim 7, where the one or more instructions, that cause the one or more processors to determine whether the second network device is categorized as a root device or a leaf device within the Ethernet Tree service, are to:
determine whether the second network device is categorized as a root device or a leaf device within the Ethernet Tree based on information stored in a Layer 2 data structure or a Layer 3 data structure.

13. A method, comprising:
receiving, by a provider edge device and from a first customer edge device, network traffic destined for a local area network associated with a second customer edge device,
the provider edge device being directly connected to the first customer edge device, the provider edge device not being directly connected to the second customer edge device;

identifying, by the provider edge device and based on the network traffic, a Layer 3 address associated with the second customer edge device;

receiving, by the provider edge device and from another provider edge device that removes Layer 2 information from traffic transmitted to the provider edge device, the Layer 3 address and a tree node type indicator associated with the Layer 3 address, the tree node type indicator associated with the Layer 3 address indicating that the second customer edge device, associated with the Layer 3 address, is categorized as a leaf device within an Ethernet Tree service;

determining, by the provider edge device, whether the first customer edge device is categorized as a root or a leaf within an Ethernet Tree service provided by the provider edge device;

determining, by the provider edge device and based on the Layer 3 address and the tree node type indicator associated with the Layer 3 address, whether the second customer edge device is categorized as the root or the leaf within the Ethernet Tree service; and selectively dropping or transmitting, by the provider edge device, the network traffic based on:

determining whether the first customer edge device is categorized as a root or a leaf within the Ethernet Tree service, and determining whether the second customer edge device is categorized as a root or a leaf within the Ethernet Tree service.

14. The method of claim 13, further comprising:

determining that the first customer edge device or the second customer edge device is categorized as a root within the Ethernet Tree service; and where selectively dropping or transmitting the network traffic comprises:

transmitting the network traffic based on determining that the first customer edge device or the second customer edge device is categorized as a root within the Ethernet Tree service.

15. The method of claim 13, further comprising:

determining that both the first customer edge device and the second customer edge device are categorized as leafs within the Ethernet Tree service; and where selectively dropping or transmitting the network traffic comprises:

dropping the network traffic based on determining that both the first customer edge device and the second customer edge device are categorized as leafs within the Ethernet Tree service.

16. The method of claim 13, where the provider edge device is included in an Ethernet Virtual Private Network, with one or more other provider edge devices, to provide the Ethernet Tree service.

17. The method of claim 13, further comprising:

storing the Layer 3 address in association with the tree node type indicator that indicates whether the second customer edge device is categorized as a root or a leaf within the Ethernet Tree service.

18. The method of claim 17, where determining whether the second customer edge device is categorized as a root or a leaf within the Ethernet Tree service further comprises:

determining whether the second customer edge device is categorized as a root or a leaf within the Ethernet Tree service based on storing the Layer 3 address in association with the tree node type indicator.

19. The provider edge device of claim 1, where the one or more processors are further to:

store a Media Access Control (MAC) address and the tree node type indicator in a Layer 2 data structure, where the Layer 2 data structure includes at least one of:

a MAC address table, or a content addressable memory (CAM) table.

20. The non-transitory computer-readable medium of claim 7, where the one or more instructions, when executed by the one or more processors, cause the one or more processors to:

store a Media Access Control (MAC) address and the tree node type indicator in a Layer 2 data structure, where the Layer 2 data structure includes at least one of:

a MAC address table, or a content addressable memory (CAM) table.

* * * * *